J. T. LISTER.
MACHINE FOR MAKING RUBBERIZED FABRIC TUBES AND STRIPS.
APPLICATION FILED JAN. 24, 1916.

1,304,995.

Patented May 27, 1919.
6 SHEETS—SHEET 1.

Inventor:
John T. Lister

J. T. LISTER.
MACHINE FOR MAKING RUBBERIZED FABRIC TUBES AND STRIPS.
APPLICATION FILED JAN. 24, 1916.

1,304,995.

Patented May 27, 1919.
6 SHEETS—SHEET 2.

J. T. LISTER.
MACHINE FOR MAKING RUBBERIZED FABRIC TUBES AND STRIPS.
APPLICATION FILED JAN. 24, 1916.

1,304,995.

Patented May 27, 1919.
6 SHEETS—SHEET 3.

J. T. LISTER.
MACHINE FOR MAKING RUBBERIZED FABRIC TUBES AND STRIPS.
APPLICATION FILED JAN. 24, 1916.

1,304,995.

Patented May 27, 1919.
6 SHEETS—SHEET 4.

Inventor:
John T. Lister

J. T. LISTER.
MACHINE FOR MAKING RUBBERIZED FABRIC TUBES AND STRIPS.
APPLICATION FILED JAN. 24, 1916.

1,304,995.

Patented May 27, 1919.
6 SHEETS—SHEET 5.

Inventor
John T. Lister
by Thurston & King
atty

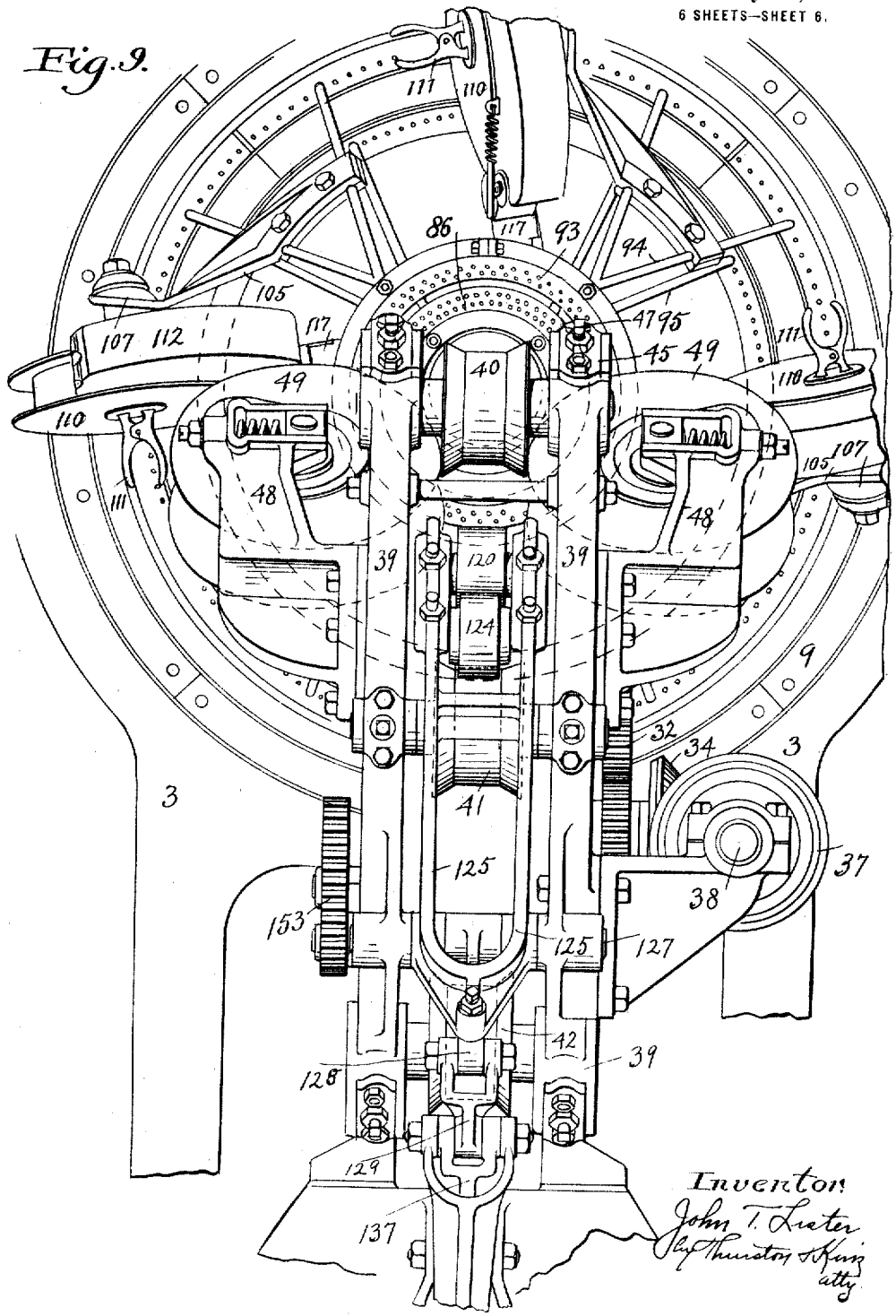

UNITED STATES PATENT OFFICE.

JOHN T. LISTER, OF CLEVELAND, OHIO.

MACHINE FOR MAKING RUBBERIZED-FABRIC TUBES AND STRIPS.

1,304,995.      Specification of Letters Patent.      Patented May 27, 1919.

Application filed January 24, 1916. Serial No. 73,861.

*To all whom it may concern:*

Be it known that I, JOHN T. LISTER, a citizen of the United States, residing at Cleveland, in the county of Cuyahoga and State of Ohio, have invented a certain new and useful Improvement in Machines for Making Rubberized-Fabric Tubes and Strips, of which the following is a full, clear, and exact description.

This invention relates to a machine for making strips of fabric particularly cord fabric which may be used in the manufacture of automobile tires and for other purposes. The machine is of the same general character as that set forth in my Patent No. 1,147,254, granted July 20, 1915, and forms a tire strip such as set forth and claimed in my Patent No. 1,147,253, granted July 20, 1915.

The object of the invention is to provide a machine having certain improvements over that shown in my previous patents, which improvements will appear as the specification is read.

Figure 1:
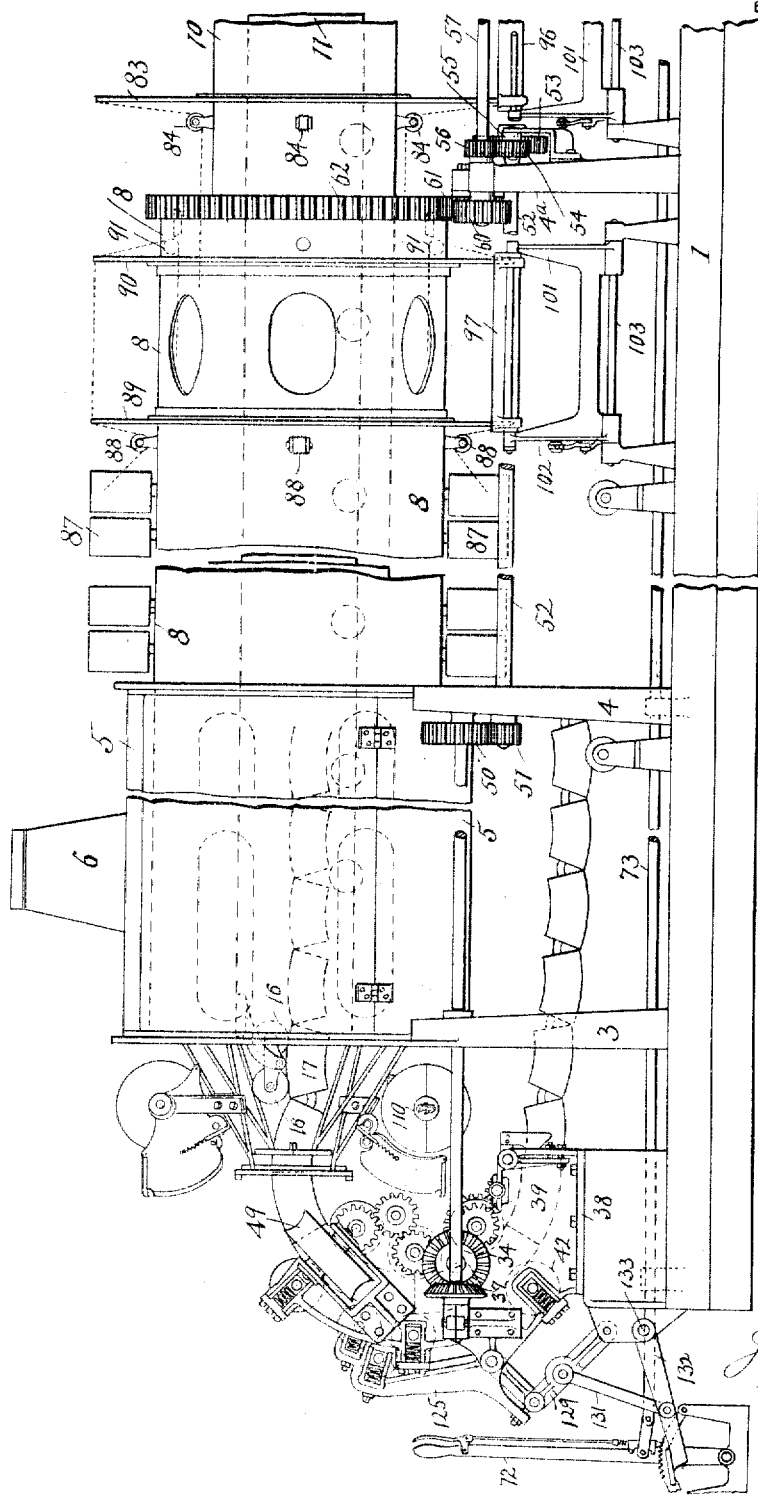
Figure 2:
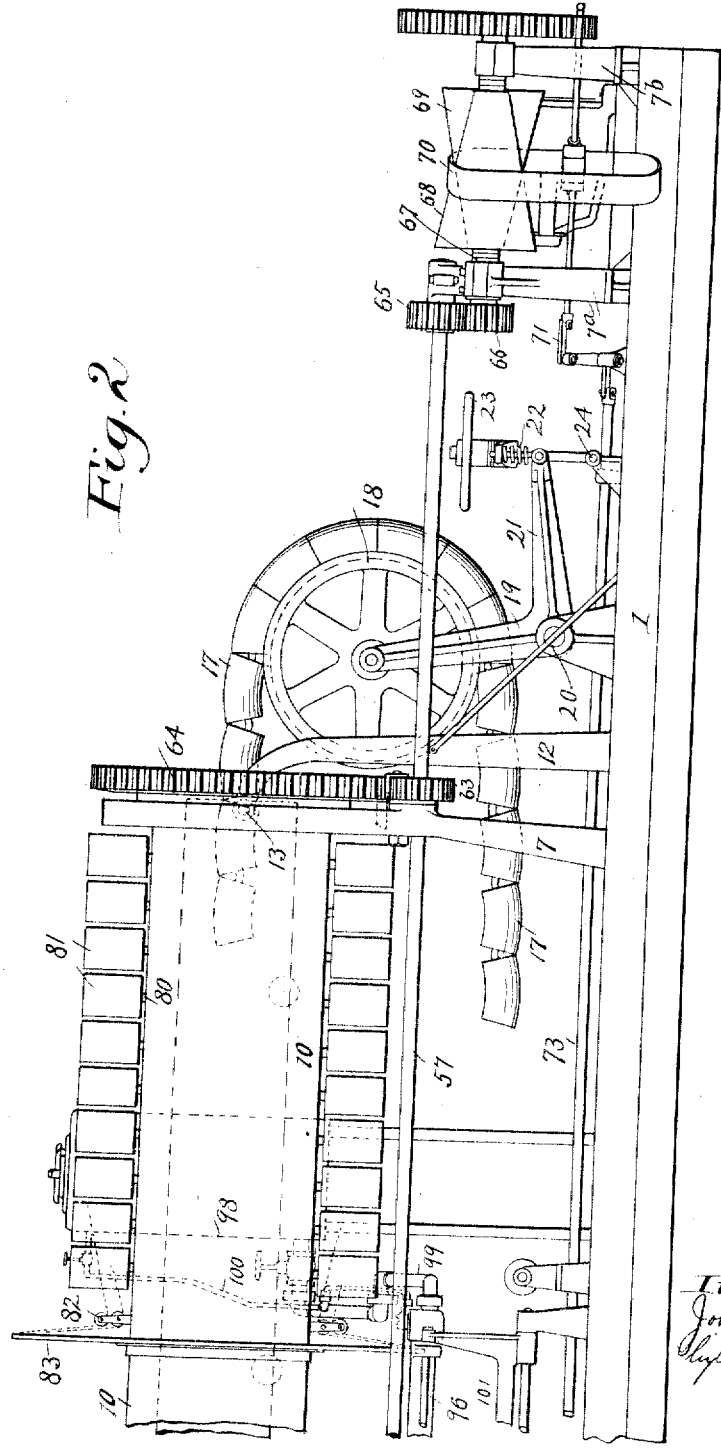
Figure 3:
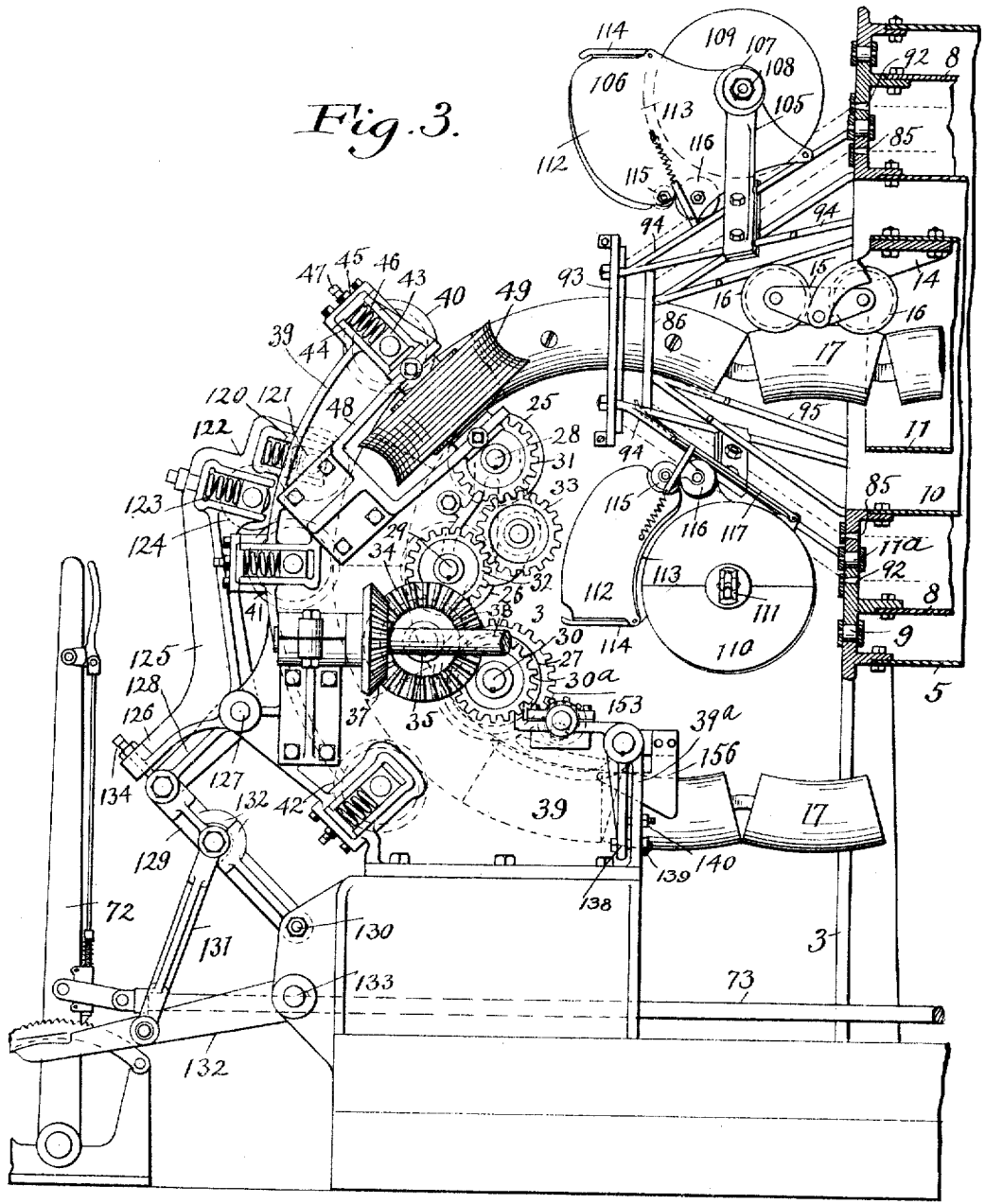
Figure 4:
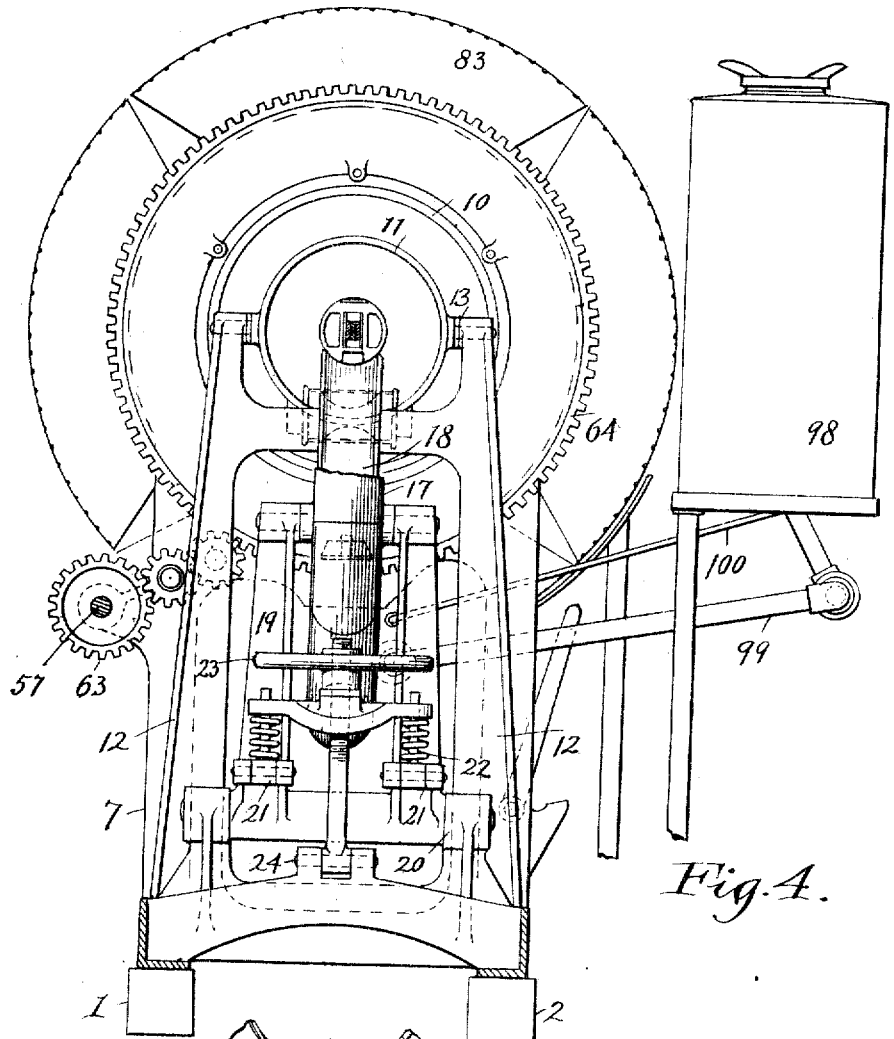
Figure 5:
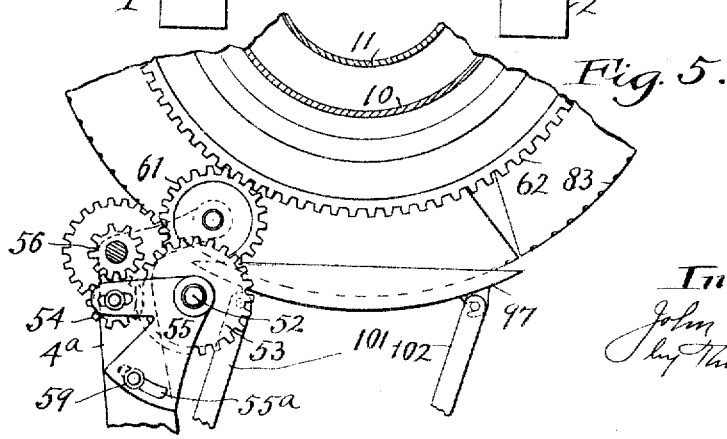
Figure 7:
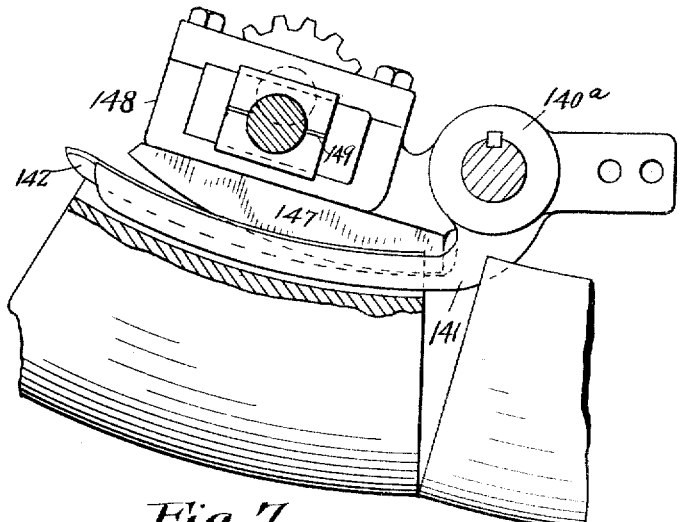
Figure 8:
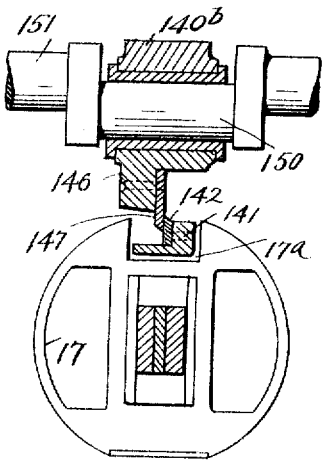
Figure 6:
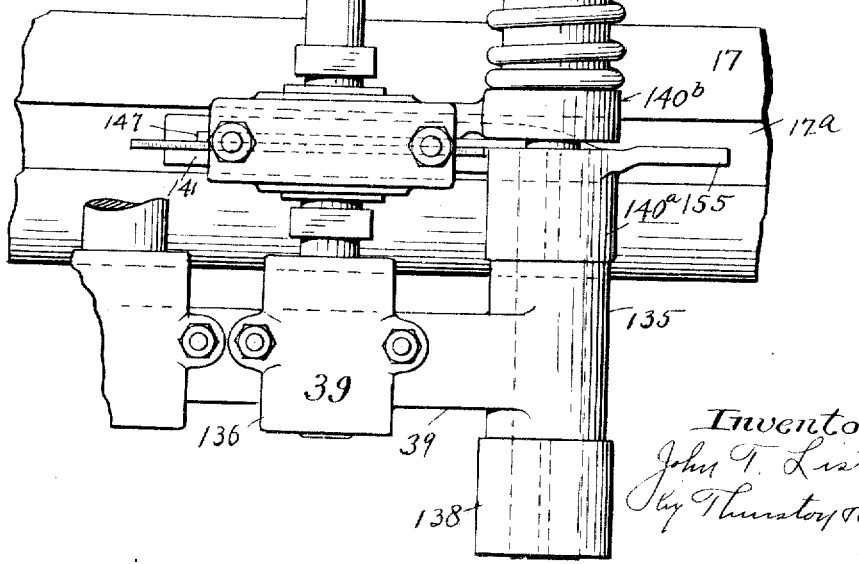

Reference should be had to the accompanying drawings to form a part of this specification, in which Figure 1 is a side elevation of the portion of the machine; Fig. 2 is a side elevation of the remaining portion of the machine. Figs. 1 and 2 showing a complete side elevation of the whole machine; Fig. 3 is a side elevation with portions in sections of the forward end of the machine; Fig. 4 is a rear elevation of the machine with the driving pulleys omitted; Fig. 5 is an elevation of a portion of the machine showing certain details of construction; Fig. 6 is a top plan view of the portion of the machine showing the mechanism for cutting the tube after being formed on the core; Fig. 7 is a side elevation with portions in section showing the cutting mechanism; and Fig. 8 is a sectional elevation of a portion of the machine showing the relation of the cutting mechanism to the core; and Fig. 9 is a front elevation showing a portion of the front end of the machine.

The entire machine may be mounted upon suitable base members 1 and 2, which extend longitudinally the length of the machine. At the forward end there is an upright supporting member 3, and adjacent this there is an upright supporting member 4. Between these upright members 3 and 4 there extends a drum 5, which is stationarily supported by the described members. At the top of the drum there is a pipe 6, which communicates with the interior of the drum, this pipe serving to pass heated gas into the drum, or may be utilized to draw air through the drum for the purpose of drying excess moisture which may be on the cords after passing through the rubber solution as later described.

At the rear portion of the machine there is an upright supporting member 7.

Extending longitudinally of the machine is a cylindrical member 8. This drum member at its forward portion is supported by the forward supporting member 3. By reference to Fig. 3 it will be seen that there are roller bearings 9 upon which a forward flange of the drum 8 is supported, so that the drum 8 may rotate. At its rear end, it is supported upon roller bearings not shown, which roller bearings provide a rotating support for the drum 8 upon the drum 10.

The drum 10 extends longitudinally throughout the length of the machine and at its forward end is supported upon a series of rollers indicated at 11ª in Fig. 3, and at its rear end is rotarily supported by roller bearings not shown mounted in the upright supporting member 7.

It will thus be seen that the drums 8 and 10 are supported to have independent rotation.

Within the drum 10 and extending longitudinally of the machine is a cylindrical drum member 11. This member 11 at its rear end is pivotally supported upon upright members 12, as indicated at 13 in Fig. 4. At the forward end of the cylindrical member 11 there is a bracket 14 in which bracket there is pivotally supported a member 15 carrying rollers 16.

The rollers 16 are adapted to bear upon a sectional core which is generally represented at 17. It will thus be seen that the cylindrical member 11 is pivotally supported at one end and at its opposite end is supported through the roller 16 by the core 17. I have, therefore, in this specification termed the cylindrical member 11 the floating cylindrical member, inasmuch as the forward end may rise or fall in accordance with the movement of the core 17.

The core 17 is similar to the core described in my previous patents, that is to say, it is made up of sections which are secured to each other in such manner as to permit a relative movement between the core sections. The core member 17 is as it will be seen, an endless core, the core in its travel passing through the floating cylinder 11 and beneath the various cylindrical members which have heretofore been described. At its rear portion, the core extends around a wheel member 18, which is grooved to fit the core. This wheel member 18 is loosely mounted in a yoke 19. The yoke is mounted in a bracket carried by the base, as indicated at 20. This yoke has a rearwardly extending arm 21 which is engaged by a spring 22. The tension on this spring is effected by means of a wheel 23, the mounting for the wheel being pivotally carried by a member upon the base, as indicated at 24. It will be evident that the movement of the wheel 23 varies the pressure upon the arm 21, which in turn may rock the yoke 19 to take up or relieve the tension in the core.

At its forward end the core member is adapted to pass over certain rollers, which cause the core sections to assume a definite shape, all of which will be presently described. There are three rollers, indicated at 25, 26 and 27 over which the core passes. These rollers are concave at the periphery and are adapted to engage with the inner portion of the core members as they pass over the rollers just mentioned. These roller members are so placed with respect to each other that as the core members pass over the rollers the core members will assume a definite form, that is to say, the sections forming the core will be together, as indicated in Fig. 3, and when they are thus together, the sections form a partial core of predetermined curvature. It will be understood that the core sections are formed transversely so as to be of the same form and size as the interior of the finished tire which it is desired to produce and the radius of curvature of the cores as they pass around the rollers 25, 26 and 27 is such as to produce a tire tube which will have the proper curvature for the size of tire which it is desired to produce.

The roller 25 is mounted upon a shaft 28; the roller 26 is mounted upon a shaft 29; and the roller 27 is mounted upon a shaft 30. Upon shaft 28 there is a gear 31, and upon shaft 29 there is a gear 32.

There is an idler gear 33 which connects the gears 31 and 32, so that it will be seen that these gears both drive in the same direction.

A gear 34 is mounted upon a shaft 35. This shaft extends transversely of the machine and carries a gear which meshes with both the gear 33 and the gear 30ª carried by the shaft 30. It will, therefore, be seen that gears 32 and 30ª drive in the same direction. The gear which is carried by the shaft 35 lies behind the beveled gear 34 and hence is not seen in Fig. 3 of the drawings.

The gear 34 meshes with a beveled gear 37, this latter gear being carried upon a shaft 38. The shaft 38 extends toward the rear portion of the machine and is directly driven in a manner which will be subsequently described. From the foregoing description it will be apparent that the rollers 25, 26 and 27 are all positively driven in a counter-clockwise direction and these rollers bear against the inner side of the core or more correctly speaking against the inner side of the fabric, which is woven upon the core.

The shafts 30, 29 and 28, as well as the shaft upon which the idle gear 33 is mounted, are all suitably mounted in journals carried by an arc-shaped bracket generally represented at 39. This bracket is bolted to the base of the machine as illustrated in Fig. 3 and extends upwardly along the outer portion of the core.

This bracket also carries three rollers 40, 41 and 42, which rollers are provided with a concave peripheral surface, which is of such a shape that it will fit against the outer portion of the core and the function of these rollers is to engage with the fabric formed upon the core to press the fabric into proper shape, so that it will conform to the core.

These rollers are each mounted in journal blocks 43, these blocks being mounted in brackets 44 which are provided with sides along which the journal brackets may slide. These brackets 44 are provided with caps 45 and between each cap and each block there is a spring 46, the tension of this spring being regulated by a screw 47.

Upon each side of the bracket 39 there is bolted a bracket 48 in which bracket there is journaled a presser roller 49. This roller has a concave peripheral surface which is adapted to bear against the side of the core or more correctly speaking, the side of the fabric which is woven upon the core and so press it so as to conform it to the core.

It will be seen that the roller 40 and the roller 25 are in line, while the roller 49 and its complementary roller upon the opposite side of the core are also in alinement, so that the fabric woven upon the core will almost immediately after it is woven on the core be subject to pressure upon substantially all portions thereof, pressing it into conformity with the core. The rollers 41 and 42 upon the outside of the tubular fabric and the rollers 26 and 27 upon the inside of the tubular fabric will each engage with and roll the tubular fabric into conformity with the core. It has been noted that the rollers 41 and 26 are placed so as to bear upon directly opposite portions of the core and the rollers 42 and 27 are similarly disposed.

Each of the rollers which have been described as bearing upon the core is formed of a plurality of disk-like sections, such as illustrated in connection with the roller 49.

These disk-like sections are free to move relatively to each other, so that there will be no binding or drawing action between the fabric on the core and the parts of the roller with which the fabric may be in contact. Any variation in the relative speed of the various portions of the core would merely produce relative rotation between the disk-like portions making up each roller, so that there will be no unequal stretching of the cords making up the fabric.

The shaft 38 extends rearwardly and is journaled in the upright 3 and also at its end is journaled in the upright 4. This shaft is through the gears 50 and 51 connected with a shaft 52. The shaft 52 extends rearwardly, being journaled in the upright 4 and at its end journaled in the upright 4ª. The shaft extends beyond the upright 4ª and at its end carries a gear 53. A gear 54 is mounted in a movable bracket 55, this gear meshing with the gear 53, and also meshing with the gear 56, which is carried upon a shaft 57. The movable bracket 55 is pivotally mounted upon the shaft 52 and is secured and held in place by means of a nut and bolt 59 or equivalent structure, the nut and bolt extending through a slot 55ª and into a hole or opening in the bracket 4ª.

The shaft 57 is journaled in the upright 4ª and carries a gear 60 which meshes with a gear 61, the last mentioned gear engaging with a large gear member 62 which is carried at the end of the drum or cylindrical member 8.

The shaft 57 extends rearwardly from the upright 4ª and is journaled in the upright 7. The shaft 57 carries a gear 63 which meshes with a large gear 64 carried by the end with the drum or cylindrical member 10. The shaft 57 extends rearwardly and the end thereof is journaled in the upright 7ª. Shaft 57 near the end thereof carries a gear 65 which meshes with a gear 66, the gear 65 being carried upon a shaft 67 which is journaled in the upright 7ª and the upright 7ᵇ. Upon this shaft there is a cone pulley 68 and upon a shaft, suitably mounted in uprights, extending parallel with shaft 67 there is a cone pulley 69. The cone pulley mechanism may be driven in any suitable manner.

The belt 70 connecting the cone pulleys may be shifted to vary speed of the device and in this particular instance the mechanism employed is a lever mechanism generally represented at 71, this mechanism being operated by a hand lever 72, which is located at the forward end of the machine and is connected with a belt shifting mechanism at the rear of the machine by means of a long rod 73.

If we assume that the shaft 57 is driven in a clockwise direction, it will be seen that the drum 10 will be driven in a counter-clockwise direction, while the drum 8 will be driven in a clockwise direction, so that the drums 8 and 10 are driven in opposite directions. By the gearing connection between shafts 57 and 52, the shaft 52 will be driven in a clockwise direction and by the gearing connections between the shafts 52 and 38, the shaft 38 will be driven in a counter-clockwise direction. This will cause the gear 34 to be driven in a clockwise direction, while the gears operating the rollers 25, 26 and 27 will be driven in a counter-clockwise direction.

The speed at which the drums or cylindrical members 8 and 10 are driven is the same and the speed at which these drums are driven relative to the speed at which the rollers 25, 26 and 27 are driven is an important consideration. This is due to the fact that the relative speed between the parts just mentioned will govern the manner in which cords are laid upon the core as it travels. If the speed at which the drums 8 and 10 are turning is too slow with respect to the speed at which the rollers are turning and thus tending to move the core, the cords will be spread and separated to an extent too great and the reverse condition will be true if the relative speeds are the reverse of that just mentioned. It is, therefore, necessary to control the relative speeds of the rollers and of the drums. When once this speed is satisfactorily adjusted it requires no change so long as conditions remain unchanged.

I have, therefore, provided a means by which the relative speeds of the rollers and the drums may be changed, but this means of changing the speed is substantially permanent when once the desired change has been effected. The speed relationship between the drums 8 and 10 and the driven rollers engaging the core is the same as the speed relationship existing between the shafts 52 and 57. It will be recalled that in the previous description and in this connection reference should be had to Fig. 5. The shafts 57 and 52 are connected through the gears 53, 54 and 56. It has been found that such adjustment as may be needed between the speeds of the two shafts in question may very readily be taken care of by changing the gear 54 and putting in a gear having a few more or less teeth than the particular gear in use at the time the change is desired. This is readily accomplished by means of the movable bracket construction which permits the gears to be thrown out of mesh and the ready substitution for the gear 54 of a gear of suitable number of teeth to effect the change of relationship of the speeds of shafts 52 and 57.

Upon the drum 10 there are carried spindles 80 each adapted to receive a spool 81 of rubberized cord, such as is used in the making of cord tires. The cord from each spool is laid over a suitable wheel guide 82 and through an opening in a circular frame 83 which is carried by the drum 10, which cord is then received upon an individual wheel guide 84 and extends parallel with the drum 10 within the drum 8 and the casing 5 and through an opening in the head of the drum 10, such as illustrated at 85; the cord then extends through a suitable opening in the plate 86 and is applied upon the core 17.

Similarly the cylindrical member or drum 8 is provided with means upon which are mounted spools 87 of rubberized cord. A cord from each spool extends over a wheel guide 88 and through openings in the parallel plates 89 and 90. It is thence laid over a guide pulley 91 and extends parallel with the drum 8 upon the inner side thereof. The cord then passes through a suitable opening such as is indicated at 92, Fig. 3, which opening is formed in the head of the drum 8. The cord then extends through an opening in the plate 93 and thence is wound upon the core.

The plates 86 and 93 are provided with a sufficient number of holes to receive the proper number of cords for the winding of the tire. The plate 93 is mounted upon suitable brackets shown at 94, which brackets are secured to the head of the drum 8, while the plate 86 is mounted upon brackets 95 which are secured to the head of the drum 10. It will be seen that the plates are provided with the central openings through which the core 17 extends. The plates 86 and 93 being mounted upon the respective cylinders 10 and 8 will turn or rotate in the same direction as do the cylindrical members themselves. Thus the cord passing from the plate 86 to the core will be wound upon the core in one direction, while the cord passing to the core from the plate 93 will be wound in the opposite direction.

Each cord in the course of its travel from a spool to the plates 86 and 93 by which it is wound on the core, is coated with a proper rubber solution. For this purpose, I have provided receptacles 96 and 97. The receptacle 96 is located between the plates or guides 83 and 83ᵃ and is mounted in such a manner that the cords extending between these plates will be immersed within the receptacle 96 as the drum 10 is turned. Similarly the container 97 is so placed with respect to the plates 89 and 90 that the cords passing over the periphery of these plates will be immersed in the bath of the receptacle 96 as the drum rotates.

Each receptacle is shallow, as will be seen from the drawing at Fig. 5. Each receptacle is supplied from a tank, such as indicated at 98 in Fig. 4. Such a tank will be provided with an outlet pipe 99, this pipe leading to the receptacle which it is adapted to serve. There is also connected with each receptacle a pipe 100, the end of which is suitably opened or closed in accordance with the level of the liquid within the container with which it is connected. This pipe 100 is connected with the upper portion of the tank 98 and as the level of the liquid in the receptacle such as 97 falls below a predetermined limit so as to permit air to enter the pipe 100 and thus admit air to the interior of the tank 98, the material within the tank 98 will be permitted to flow through the pipe 99 in proportion to the air admitted to the tank 98. As soon as the level of the liquid within the receptacle 97 has risen to the proper amount, the end of the pipe 100 will be sealed and so prevent any further supply of rubber solution material to the pan or receptacle 97. With this mechanism, it is possible to keep a small quantity of rubber solution in the tank 97, which quantity of solution will always be sufficient to meet requirements, but there will never be an excess of solution and thus practically all waste of the solution is avoided or excessive deterioration of solution due to the air.

It will be noted that the pan 97 is mounted upon levers 101 and 102. These levers are pivoted upon a rod 103. The pivoted mounting of the pan 97 permits it to move downwardly away from the guiding disks 89 and 90 for purposes of inspection and for any other reason.

It is my purpose to wind a strip of unvulcanized rubber between the layer of cords wound upon the core by the plate 86 and the layer of cords wound upon the core by the plate 93. For this purpose I employ a plurality of devices which for convenience may be mounted upon brackets or supports 94 which carry the winding plate 93. Each of these devices is of similar construction and functions in the same manner. Therefore, I will describe the operation of a single device which will suffice for an understanding of the construction and operation of the several devices shown in the drawing. Each device is mounted upon a bracket 105, which bracket is carried by one of the braces 94 supporting the plate 93 from the drum 8. To this bracket there is secured a side plate 106, the manner of securing this plate being by means of a ball and socket joint 107, so that the plate 106 may be adjusted with respect to the bracket 105. The ball and socket joint, however, may be rigidly and securely fastened by means of a nut 108. The ball and socket joint carries a stud upon which is mounted one portion of a spool 109; the other portion or cover portion 110 being removably carried by the stud heretofore mentioned, plate 110 being detachably carried upon the stud heretofore described, in any convenient manner as by a clip 111. The plate 106 forms one side of a box-like structure 112. This box-like structure is provided with an inner partition 113 and a cover 114. Adjacent to the end of the box-like structure opposite to that to which the cover is carried, there is an opening in which is situated a roller 115. This roll coöperates with the roller 116 which is mounted upon a suitable stud carried by a side plate 106. The roller 116 is a narrow roller and is adapted to engage with the rubber tape carried upon the spool 109.

There is also a chute associated with each device which chute is shown in side elevation at 117 in Fig. 3. The chute is pivoted upon the side member 106 and extends in a diagonal direction toward the core 17. The chute is merely a trough through which the rubber strip is fed from the reel 109, but the chute is so positioned relative to the core that the rubber strip will be directed upon the core at a proper angle.

The strips of rubber are so directed upon the core as to form a single layer of rubber or a plurality of layers.

An unvulcanized rubber strip such as used for the purpose herein described is supplied with a backing of sized cloth, this being for the purpose of supporting the unvulcanized rubber which has, practically speaking, no inherent strength and for the purpose of preventing the successive layers sticking together. It is necessary to remove the cloth from the rubber as the strip is wound from the reel 109 and passes to the core. This is accomplished by starting the strip of cloth between the rollers 115 and 116, the roller 116 gripping the cloth and so forcibly removing the strip of cloth from the rubber, as the rubber strip is drawn onto the core, that the cloth thus separated from the rubber strip is passed into the receptacle 112 and is stored therein. From this receptacle the cloth tape may be removed when the receptacle becomes filled.

It will be understood that the winder plates 86 and 93 and the intermediate strip or strips of rubber wound between the layers of cord, will form tubular fabric upon the portion of the core which is caused to assume a semi-circular shape and this tube will be continually formed as the core travels and the winder plates turn around the core.

The tubular fabric is split or cut at a point shortly after passing between the rollers 27 and 42 and for this purpose I employ a shearing mechanism which I will now describe.

The bracket 39 has formed thereon a journal 135 and a journal 136. Through the journal 135 there extends a non-rotating shaft 137. This shaft extends outwardly beyond the journal 135 and receives the hub end of a lever 138, the hub end being keyed to the shaft 137 (see Fig. 6). This lever is shown in Fig. 6 and Fig. 3. The lever extends downwardly and is held against an upright portion 39ª of the bracket 39, by means of a nut and bolt 139. There is a set screw 140 which extends through the part 39ª and bears against the lever 138. By manipulating the set screw 140 and the nut and bolt 139, the position of the arm 138 may be varied in a manner which will be obvious from the description and drawing.

Upon the shaft 137 there is keyed a hub 140ª and this hub carries one of the shearing members 141, the same being more clearly shown in Fig. 7. This shearing member 141 carries a cutting blade 142, which is secured to the member 141 in any desired manner. From the drawing, it will be seen that the member 141 extends within a groove 17ª formed in the inner portions of each core block. These grooves are in alinement at the various portions of the core and are brought together in passing over the rollers at the front end of the machine.

Upon the shaft 137 there is also a hub 140ᵇ. This hub member is loose upon the shaft and is provided with an extending collar 140ᶜ (see Fig. 8). Surrounding this collar is a coil spring 143, the coil spring bearing against the hub 140ᵇ at one end and at its opposite end bearing against a washer 144, the washer just mentioned being held upon the shaft 137 by the nut 145. The hub 140ᵇ has secured thereto a shearing member 146 and the shearing member 146 carries the blade or cutter 147. The two cutters 142 and 147 engage each other after the fashion of a pair of shears, the spring 143 holding the cutting blades just mentioned in proper position relative to each other to effect the shearing action.

The shearing member 146 is provided with a yoke 148 as shown in Fig. 7. This yoke receives a journal 149 through which journal there extends the crank portion 150 of a crank shaft 151.

The crank shaft 151 is a short shaft, one end of which is journaled in the bearing 136 upon the frame 39, the shaft being a short shaft, only one end thereof is journaled. The opposite end of the shaft 151 is provided with a gear 152 which meshes with a gear 153 shown in Fig. 3, this gear being carried upon the shaft 30ª. From this construction it will be seen that the shearing member 146 is operated through the train of gearing which operates the rollers engaging the inner side of the core at the front end of the machine.

The shearing member 146 is mounted on the crank arm 150 in a manner which permits a slight sliding motion and it will be remembered that the hub 140ᵇ is unsecured to the shaft 137. Therefore, there is a slight sliding movement permitted to the shear member 146 in the operation of the parts described.

The lower shearing member 141 extends inside of the tubular fabric upon the core, while the shearing member 146 is upon the outside of the fabric. The operation of the shearing members is such as to continually cut the fabric as it moves along the core.

Upon the hub 140ª there is a rearwardly extending arm 155. This arm carries a member 156 shown in Fig. 3, this member being so shaped as to spread and part the tubular fabric after it has been cut, so that it may be readily disengaged from the core.

It may be desirable to place a strip of unvulcanized rubber upon the outside of the fabric tube which is formed on the core and particularly upon that portion of the tube which will correspond with the outer or tread portion of the tire. This strip of rubber may be placed upon the tubular fabric on the core by means of a suitable roller, such as illustrated at 120 in Fig. 3. This roller will be formed at the periphery in a manner suitable for the purpose. The roller will be journaled in a block 121 slidingly carried within a frame 122. A spring 123 will occupy a position between the block 121 and the frame in which it is carried, thus placing the roller 120 under spring tension. There will also be a roller 124 which will engage the roller 120. This roller will be mounted in the frame 122 in a manner similar to that described for roller 120. The frame just mentioned is carried upon an arm 125 which has an extending portion 126. This arm will be mounted upon the bracket or standard 39, as indicated at 127. There is also mounted upon the standard 39 at 127 an arm 128. This arm is joined to one end of a toggle lever 129, which toggle lever at its opposite end is pivotally mounted upon the base of the machine as indicated at 130. There is a rod 131 which is pivotally mounted to the toggle lever 129 at the middle or breaking point thereof. This toggle lever is provided with stops 132 which engage when the members of the toggle are in alinement with each other. The rod 131 is pivotally connected with an operating lever 132. This lever is pivoted at one end upon the base of the machine as indicated at 133. The lever 125 is moved as the members of the toggle lever are brought in position, as shown by the drawing, and when this is done the lever 125 is moved so as to move the roller 120 against the tubular fabric on the core. There is an adjustable relationship between the lever 125 and the toggle lever which is accomplished by means of the set screw 134. This set screw may be adjusted so as to vary the pressure with which the roller 120 will engage with the tubular fabric upon the core. When the toggle lever is moved so that the parts thereof are not in alinement, the pressure of the roller 120 is relieved, as will be understood from the description and the drawing.

When the roller 120 is used, a strip of unvulcanized rubber carried upon the fabric as is usual and of proper width will be received from a source which is not shown. This composite strip will pass around the roller 120 in such a manner that the rubber part is in contact with the tubular fabric upon the core, while the cloth strip will lie against the roller 120. The strip of cloth will be separated from the rubber after passing beneath the roller 120, the strip of cloth passing between the rollers 120 and 124. The movement of the roller 120 will be secured by the movement of the rubber strip as it engages with the fabric upon the core. The cloth strip will be positively removed from the rubber by the co-action of the rollers 120 and 124. The rubber strip which may thus be placed upon the outside of the tubular fabric will be pressed against the fabric not only by the roller 120, but by the rollers 41 and 42.

It is essential that the sections of the core, which are caused to assume the desired shape at the winding end of the machine, be closed and in close engagement. The forward end of the cylindrical member through the rollers 16 bearing its weight upon the core just behind the cord winders, insures the proper closure of the core sections at the cord winders. The cylindrical member 11 at its forward end is free to move to accommodate any variations in the tension upon the segmented core, but will always exert the necessary pressure to close the segments at the point where the cord is wound on the core.

Having thus described my invention, what I claim is:—

1. An apparatus for forming tubular fabric comprising a segmented traveling core, means adapted to receive a portion of said core and to cause the segments of said portion to close and assume a substantially rigid arc-shaped form, and means separate from the aforesaid means coöperating with the core to insure the proper closing of the segments thereof, and means for winding material about the core.

2. An apparatus for forming tubular fabric comprising a segmented traveling core, means adapted to receive a portion of said core and to cause the segments of said portion to assume a substantially rigid arc-shaped form, means bearing upon said core in advance of the aforesaid means to cause the segments to close, and means for winding material upon the core.

3. An apparatus for forming tubular fabric comprising a segmented traveling core, means adapted to receive a portion of the core and cause said portion to assume a substantially rigid arc-shaped form, a weighted rotatable member bearing upon the core in advance of the aforesaid means to cause the closure of the segments, and means for winding material upon the core.

4. An apparatus for forming tubular fabric, comprising a segmented traveling core, means adapted to receive a portion of said core and causing the segments of said portion to close and assume a substantially rigid semi-circular form, a tubular member surrounding the core, means for pivotally mounting said tubular member at one end thereof, rotatable member mounted at the opposite end of the tubular member, said rotatable member engaging the core adjacent the aforesaid portion thereof, thereby insuring a proper closing of the segments and means for winding material upon the said core.

5. An apparatus for forming tubular fabric, comprising an outer layer forming member adapted to carry a source of cord supply and a winding means, an inner layer forming member adapted to carry a source of cord supply and a winding means, a core shaping means having rotatable members, a traveling core adapted to pass over said core shaping means whereby the said portion of the core is caused to assume a substantially rigid semi-circular form, means for driving the outer layer forming member and the inner layer forming member in opposite directions, means for driving the rotatable members included in the core shaping means, and means whereby the relationship between the driving speed of the layer members and the driving speed of the said rotatable members may be varied.

6. An apparatus for forming tubular fabric, comprising an outer layer forming member adapted to carry a source of cord supply and a winding means, an inner layer forming member adapted to carry a source of cord supply and a winding means, a core shaping means having rotatable members, a traveling core adapted to pass over said core shaping means whereby the core is caused to assume a substantially rigid semi-circular form, driving means for the said layer forming members and driving means for the rotatable members of the core shaping means, and a geared connection between the two driving means aforesaid, through which the driving speed of the layer forming members may be varied with respect to the driving speed of the said rotatable members.

7. An apparatus for forming tubular fabric, comprising an outer layer forming member, adapted to carry a source of cord supply and a winding means, an inner layer forming member adapted to carry a source of cord supply and a winding means, a core shaping means having rotatable members, a traveling core adapted to pass over said core shaping means whereby the core is caused to assume a substantially rigid semi-circular form, means for driving the said layer forming members, means for driving the said rotatable members of the core shaping means, means for operatively connecting the aforesaid two driving means, comprising gears, one of which is associated with the means for driving the said rotatable members, another of said gears being connected with the driving means for the layer forming members, a gear meshing with the aforesaid gears, a movable bracket upon which the last mentioned gear is carried, the said bracket being movable to permit the removal and replacement of the gear carried thereby for the purpose described.

8. An apparatus for forming tubular fabric, comprising a traveling core, means adapted to receive a portion of said core to cause the said portion of the core to assume a substantially rigid semi-circular form, means for winding cords upon the said portion of the core, and shear members adapted to operate upon the tubular fabric formed upon the core to cut a longitudinal slit in the fabric after it has been formed upon the said portion of the core.

9. An apparatus for forming tubular fabric, comprising a traveling core, means adapted to receive a portion of said core to cause the said portion of the core to assume a substantially rigid semi-circular form, a pair of shear members, one extending within the tubular fabric formed upon the aforesaid portion of the core and the other upon the outside of said tubular fabric, and means for operating said shear members to cut the tubular fabric.

10. An apparatus for forming tubular fabric, comprising a traveling core, means adapted to receive a portion of said core to cause the said portion of the core to assume a substantially rigid semi-circular form, a pair of shear members, one of said shear members being rigidly mounted and extending within the tubular fabric formed upon the aforesaid portion of the core, the other of said shear members being pivotally mounted and means for reciprocating the pivotally mounted shear member for the purpose described.

11. An apparatus for forming tubular fabric, comprising a traveling core, means adapted to receive a portion of said core to cause the said portion of the core to assume a substantially rigid semi-circular form, a shear member stationarily mounted and extending within the tubular fabric formed upon the aforesaid portion of the core, a movable shear member pivotally mounted, resilient means pressing the pivotally mounted shear member, means for moving the pivotally mounted shear member for the purpose described.

12. An apparatus for forming tubular fabric, comprising a traveling core, means adapted to receive a portion of said core to cause the said portion of the core to assume a substantially rigid semi-circular form, said means including rotatable members, means for driving said rotatable members, a pair of shear members, one shear member being stationarily mounted and adapted to extend within the tubular fabric, the other of said shear members being pivotally mounted and extending upon the outerside of the tubular fabric form, means for moving the last mentioned shear member, said means being operated by the same means which drives the rotatable members of the core shaping means.

13. An apparatus for forming tubular fabric, comprising a traveling core, means adapted to receive a portion of said core to cause the said portion to assume a substantially rigid semi-circular form, said means including rotatable members, means for driving said rotatable members, a stationary shaft extending transversely of the core at a point beyond where the said rotatable members engage the core, a shear member secured upon said shaft and adapted to extend within tubular fabric formed, a shear member pivoted upon said shaft adapted to extend upon the outside of the tubular fabric, a resilient member pressing upon the said movable shear member to press it into engagement with the stationary shear member, a crank shaft extending transversely of the core adjacent the stationary shaft, the crank portion of said shaft being secured to the movable shear member, whereby the shear member is operated as the crank shaft is turned and means for operating said crank shaft by the means which drives the rotatable members of the core forming means.

14. An apparatus for forming tubular fabric, comprising a traveling core, means adapted to receive a portion of said core and cause it to assume a substantially rigid and semi-circular form, means for operating a plurality of devices for holding rubber strips, a chute associated with each device for directing a rubber strip at the proper angle with respect to the core, the said rubber strips being wound between the layers of cord.

15. An apparatus for forming tubular fabric, comprising a traveling core, means adapted to receive a portion of said core to cause the core to assume a substantially rigid semi-circular form, a plurality of winders adapted to wind a plurality of layers of cord upon said core, a plurality of devices for supporting rubber strips which are carried by one of said winding devices, means associated with each supporting device for directing the rubber strips at a proper angle upon the core, the said strips being wound between the layers of the cord.

16. An apparatus for forming tubular fabric, comprising a traveling core, means adapted to receive a portion of said core to cause the same to assume a substantially rigid semi-circular form, means for winding cords upon said core, and means for laying a strip of rubber upon the outer portion of the tubular fabric which would correspond with the tread portion of a finished tire.

17. An apparatus for forming tubular fabric, comprising a flexible traveling core, means adapted to receive a portion of said core and cause the same to assume a substantially rigid circular form, means for winding material upon the said portion of the core, a spring-pressed roller adapted to engage the outer periphery of the tubular fabric formed on the core to press additional material against the tubular fabric.

18. An apparatus for forming tubular fabric, comprising a flexible traveling core, means adapted to receive a portion of said core and to cause the same to assume a substantially rigid semi-circular form, a lever pivoted adjacent the said core receiving means, a roller carried by said lever and adapted to engage with the outer periphery of the tubular fabric formed on the core, and means for operating said lever.

19. An apparatus for forming tubular fabric, comprising a segmented traveling core, means adapted to receive a portion of said core and cause the same to assume a substantially rigid semi-circular form, a lever pivoted adjacent that portion of the core which is semi-circular as heretofore described, a pair of spring-pressed rollers carried by said levers, the rollers engaging each other, one of said rollers being adapted to bear upon the outer periphery of the tubular fabric and means for moving said lever.

20. An apparatus for forming tubular fabric, comprising a layer forming member, means upon said member for carrying a plurality of spools of cord, a pair of disk-like members mounted upon said member, there being openings formed in said disk-like members through which a strand of cord is adapted to pass, a receptacle adapted to contain solution, said receptacle being so placed that the disk-like members extend into the receptacle whereby the cords carried by the disk-like members will be emersed in the solution in the receptacle as the layer forming member is rotated, a core and means for winding the cord upon the core.

21. An apparatus for forming tubular fabric, comprising a layer forming member adapted to support a plurality of spools of cord, a pair of spaced disk-like members carried by said layer forming member, there being openings in said disks through which the individual strands of cord are adapted to extend, a receptacle extending beneath the said disks, the said disks extending into the receptacle whereby the cord carried by the disks will be emersed in the solution that may be in the receptacle as the layer forming member is rotated, a winder carried by the outer layer forming member, means for conducting individual cords to said winder, a core upon which the said winder lays the said cords.

22. An apparatus for forming tubular fabric, comprising a layer forming member adapted to support a plurality of spools of cord, a pair of spaced disk-like members carried by said layer forming member, there being openings in the said disks through which individual strands of cord are adapted to extend, a receptacle located adjacent the said disks, the portions of the said disks extending within the receptacle, means by which the receptacle is held in proper position with respect to the disks, said means being capable of lowering the receptacle from the disks when desired, a core and means for winding the cord upon the core.

23. An apparatus for forming tubular fabric, comprising a layer forming member, means upon said member for carrying a plurality of spools of cord, means associated with the layer forming member for causing the individual cords from the various spools to assume parallel positions, a receptacle adapted to contain suitable solution through which the cords are passed, a tank containing a source of supply of the material used within the receptacle, a pipe connecting the tank with the said receptacle, an air pipe secured to the tank and extending to the receptacle, the solution within the receptacle when of proper level closing the air pipe, thereby preventing and stopping passage of the solution to the receptacle, the said air pipe when uncovered by the solution permitting the air to pass to the tank and thus supply more solution to the receptacle.

In testimony whereof, I hereunto affix my signature.

JOHN T. LISTER.